United States Patent [19]
Krishnamurti et al.

[11] Patent Number: 6,001,937
[45] Date of Patent: Dec. 14, 1999

[54] REDUCING SCALE IN VINYL POLYMERIZATIONS

[75] Inventors: Ramesh Krishnamurti, Williamsville; Sandor M. Nagy, Grand Island; Habib Hichri, Snyder; Thomas F. Smolka, West Seneca, all of N.Y.

[73] Assignee: Occidental Chemical Corporation, Dallas, Tex.

[21] Appl. No.: 09/193,919

[22] Filed: Nov. 17, 1998

[51] Int. Cl.$^6$ .............................. C08F 2/00; C08F 14/06
[52] U.S. Cl. .............................. 526/62; 526/74; 526/344
[58] Field of Search .............................. 526/62, 74, 344

[56] References Cited

U.S. PATENT DOCUMENTS

| | | | |
|---|---|---|---|
| 4,145,496 | 3/1979 | Weimer et al. | 526/62 |
| 4,256,854 | 3/1981 | Fischer et al. | 526/62 X |
| 5,393,857 | 2/1995 | Shimizu et al. | 526/918 |
| 5,403,903 | 4/1995 | Shimizu et al. | 526/62 |

FOREIGN PATENT DOCUMENTS

| | | |
|---|---|---|
| 2082461 | 5/1993 | Canada . |
| 202782 | 6/1983 | Czechoslovakia . |
| 2703280 | 8/1978 | Germany . |
| 2757924 | 7/1979 | Germany . |
| 1297405 | 11/1989 | Japan . |
| 5331209 | 12/1993 | Japan . |
| 6107705 | 4/1994 | Japan . |
| 6166702 | 6/1994 | Japan . |
| 6166703 | 6/1994 | Japan . |
| 6192303 | 7/1994 | Japan . |
| 6192304 | 7/1994 | Japan . |

*Primary Examiner*—Fred Teskin
*Attorney, Agent, or Firm*—Anne E. Brookes; Richard D. Fuerle

[57] ABSTRACT

Disclosed is a method of inhibiting the formation of scale on reactor surfaces in contact with a polymerizing vinyl monomer. The reactor surfaces are contacted with a composition that contains, as a scale reducing agent, an acidic hydrazone condensate or a salt thereof. The scale reducing agent can be added to the polymerizing monomer or it can be placed in a composition containing a surfactant and an inorganic binder and the composition can be applied to the reactor surfaces or added to the monomer.

20 Claims, No Drawings

REDUCING SCALE IN VINYL POLYMERIZATIONS

BACKGROUND OF THE INVENTION

This invention relates to the reduction of scale in the polymerization of vinyl monomers. In particular, it relates to the use of an acid hydrazone condensate or a salt thereof for that purpose.

During the polymerization of vinyl monomers, such as polyvinyl choride (PVC), tenaciously-adhering polymer scales frequently form on reactor components that come into contact with the monomer, such as the inner walls and stirrer. The reactor has to be cleaned between each batch by scraping, pressure-washing, or solvent cleaning. As a result, there is a considerable amount of reactor downtime as well as increased costs associated with maintaining a polymerization-ready reactor, which increases the overall operating cost of the process. Moreover, an operator who attempts to physically remove the scales risks exposure to harmful monomer trapped in the scales. Scale deposition also lowers polymer yield, reduces heat transfer efficiency during heating and cooling, and lowers monomer efficiency and general process control. When scales flake off and mix with the polymer, the polymer has poorer processing properties and finished products made from it are inferior. A number of different additives are known that reduce scaling, but many of them increase the yellowness of the polymer, which is unacceptable to many customers.

SUMMARY OF THE INVENTION

We have discovered that scale formation during the polymerization of vinyl monomers can be reduced by contacting the reactor surfaces with an acid hydrazone condensate or a salt thereof. The method of this invention is effective in suspension and emulsion polymerizations of vinyl monomers, not only in the liquid phase, but also at and above the gas-liquid interface. Polymers made using the scale reducing agents of this invention have much less color and little or no gray fish eyes. The scale reducing agents of this invention are easily prepared from commercially available, inexpensive starting materials. They can be applied in an aqueous medium, thereby avoiding the use of harmful and flammable organic solvents.

DESCRIPTION OF THE PREFERRED EMBODIMENTS

The scale reducing agents of this invention are acid hydrazone condensates and salts thereof. They can be made by condensing a carbonyl compound with a carbonyl derivative.

The carbonyl compound can be either an aldehyde or a ketone; aldehydes are preferred as they are more reactive. Preferably, the carbonyl compound has 2 carbonyl groups as those compounds are more readily available and form linear polymers that have better film forming properties. Polymeric carbonyl compounds containing many C=O groups can also be used. The carbonyl compound can be either aliphatic or aromatic; aliphatic carbonyl compounds are preferred as the resulting condensates are less colored. Preferred carbonyl compounds have the formulas:

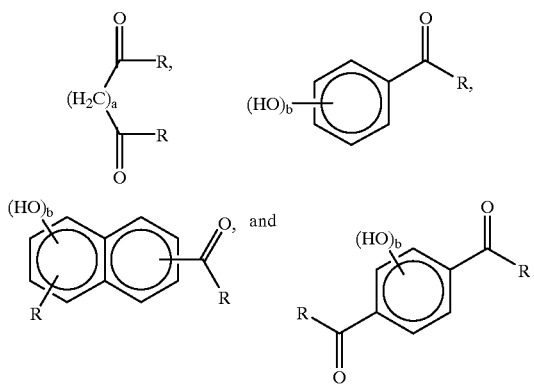

where each R is independently selected from hydrogen, alkyl from $C_1$ to $C_{15}$, or alkyl from aryl, alkaryl, aralkyl, alkarythio, or aralkylthio from $C_6$ to $C_{15}$, a is 0 to 8, and b is 0 to 5. Preferably, R is H or $C_1$ to $C_6$, a is 0, and b is 1 as those compounds are more reactive and more readily available. Both R groups are preferably the same as those compounds are easier to prepare and more readily available. Of the four formulas shown, the first is preferred because its condensates are less colored. Examples of carbonyl compounds include formaldehyde, glyoxal, acetaldehyde, salicylaldehyde, terephthaldicarboxaldehyde, benzaldehyde, 1,2-chlorobenzaldehyde, and 2-acetylphenothiazine. The preferred carbonyl compound is glyoxal as the best results were obtained with salts of condensates made from it.

The carbonyl derivatives are derivatives of acid hydrazides and contain the group —CO—NH—$NH_2$ or —CS—NH—$NH_2$. They have the general formula:

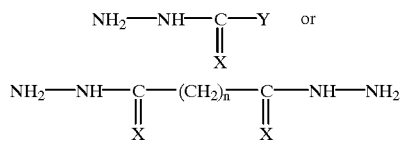

where X is oxygen or sulfur, Y is R or R substituted with $N(R')_2$, OR', COOR', or $SO_3R'$, each R' is independently selected from H, alkyl from $C_1$ to $C_{15}$, or alkaryl or aralkyl from $C_7$ to $C_{15}$, and n is 0 to 12. The Y group is preferably a carboxylic acid hydrazide that has an OH or $NH_2$ substituted aromatic ring and n is preferably 1 to 4 due to their availability and good performance. Aliphatic carbonyl derivatives are preferred because their condensates are less colored. The Y group is preferably $NHNH_2$ as those compounds give better properties, and X is preferably sulfur as those compounds are more active. Examples include carbohydrazide ($NH_2NHCONHNH_2$), thiocarbohydrizide ($NH_2NHCSNHNH_2$), semicarbazides ($NH_2NHCOY$), thiosemicarbazides ($NH_2NHCSY$), tyrosine hydrazide ($HO\phi CH_2CH(NH_2)CONHNH_2$), and adipic dihydrazide ($NH_2NHCO(CH_2)_4CONHNH_2$). The preferred carbonyl derivatives are thiosemicarbazide and tyrosine hydrazide as they gave excellent results.

Carbonyl derivatives and carbonyl compounds that produce a conjugated product should be avoided as those products tend to be colored. Stoichiometric amounts of the reactants can be used and generally no excess of either is preferred. The reactants should be dissolved in a solvent such as water or an alkanol (e.g., methanol, ethanol, propanol, or butanol). Sufficient solvent should be used to keep the reactants in solution during the reaction, but excess solvent should not be used as it is unnecessary and adds to the cost. If the carbonyl compound is an aldehyde, a catalyst is usually not needed, but if the reaction proceeds slowly, a catalyst, such as acetic acid, propionic acid, or formic acid, can be used at about 1 to about 100 wt % (and preferably at about 1 to about 10 wt %) to help dissolve the reactants. The reaction can be performed at about room temperature to about reflux and can take up to 8 hours. When the reaction is complete, the product will usually precipitate as it is insoluble.

The product of the reaction is an acid hydrazone condensate having the general formula

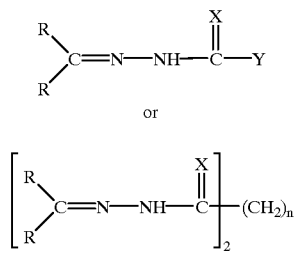

where each R is independently selected from hydrogen, alkyl from $C_1$ to $C_{15}$, or aryl, alkaryl, aralkyl, alkarythio, or aralkylthio from $C_6$ to $C_{15}$, X is oxygen or sulfur, Y is R or R substituted with $N(R')_2$, OR', COOR', or $SO_3R'$, each R' is independently selected from H, alkyl from $C_1$ to $C_{15}$, or alkaryl or aralkyl from $C_7$ to $C_{15}$, and n is 0 to 12. It can be used as is, but it is preferable to isolate it and form a solution using a solvent such as methanol, ethanol, methylene chloride, tetrahydrofuran, dimethylformamide, dimethyl acetamide, N-pyrrolidinone, or dimethylsulfoxide at about 0.0001 to about 20 wt % solids and preferably at about 0.01 to about 5 wt % solids. It is preferable to use water as a solvent and solubilize the product using a base, such as sodium hydroxide or potassium hydroxide, as this avoids the addition of another organic. Sufficient base is added to the water to form the salt, which is water soluble. The salt form has the general formula

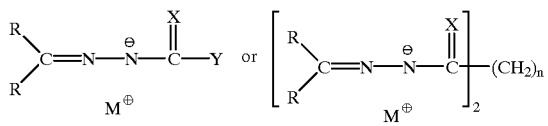

where R, X, Y, and n were defined previously and $M^{\oplus}$ is the cation from the base. The non-salt form gives a less colored polymer, but the salt form is easier to use. Some of the condensates are known in the literature, but they have not been used to prevent scale during the polymerization of vinyl monomers.

The scale reducing agents of this invention can be added directly to the monomer, but they are preferably formulated into compositions which are either applied to reactor surfaces or added directly to the monomer. Coating reactor surfaces is preferred because adding to the monomer may not protect reactor walls above the level of the liquid reaction mixture. A composition can be made, for example, of an acid hydrazone condensate (or salt thereof), about 1 to about 100 wt %, (based on weight of scale prevention agent) of a surface active agent, and about 10 to about 500 wt % (based on weight of scale prevention agent) of an inorganic binder. A preferred composition is the acid hydrazone condensate (or salt thereof), about 50 to about 100 wt % surface active agent, and about 50 to about 100 wt % inorganic binder. Examples of surface active agents that can be used include poly(vinyl alcohol) of varying degrees of hydrolysis, hydroxyethyl cellulose, hydroxypropyl cellulose, phytic acid, poly(vinyl formal), and gelatin. The preferred surface active agent is poly(vinyl alcohol) because of its varying degrees of hydrolysis. Examples of inorganic binders that can be used include fumed silica, colloidal silica, alumina, fumed alumina, titanium (IV) oxide, zirconium (IV) oxide, aluminum hydroxide, vanadium (V) oxide, and sodium silicate. The preferred inorganic binder is fumed silica because it gives superior results.

The composition can be applied to the reactor walls and to reactor components that are in contact with the monomer by any suitable means including, for example, spraying, flooding, painting, and brushing. After the application, it is not necessary to evaporate the solvent from the coating. Generally, the solids content of the coating on the reactor walls and components should be about $1\times10^{-5}$ to about $1\times10^{-3}$ g/square inch (about $1\times10^{-6}$ to about $1\times10^{-4}$ g/cm$^2$) as less may not be effective and more may be unnecessary. If the scale reducing agent is mixed into the monomer, either alone or in a composition, about 1 to about 1000 ppm scale reducing agent can be used (based on monomer weight) and preferably about 10 to about 500 ppm is used.

The scale reducing agent can be used to reduce scale during the polymerization of any vinyl monomer including vinyl chloride, vinylidene chloride, vinyl acetate, styrene, acrylonitrile, and acrylates such as methylmethacrylate. The preferred monomer is vinyl chloride as it is commercially important and the formation of scales during its polymerization is a commercially costly problem. The method of this invention can be used for emulsion polymerization, suspension polymerization, dispersion polymerization, bulk polymerization, and gas phase polymerization. Suspension and emulsion polymerizations are preferred as scale formation is an important problem during those polymerizations.

The following examples further illustrate this invention.

EXAMPLE 1

Salicylaldehyde was added dropwise over 5 min. to a solution of thiosemicarbazide (5.47 g, 60 mmol) in 75 mL water maintained at 75° C. A white solid began to precipitate immediately. The resulting mixture was heated to reflux for 2 hours, then cooled to room temperature and filtered to give salicylaldehyde thiosemicarbazone (11.5 g, 98%) as a white crystalline solid.

EXAMPLE 2

To a hot (75° C.) solution of thiosemicarbazide (3.64 g, 40 mmol) was added 2'-hydroxypropiophenone (6 g, 40 mmol) dissolved in 40 mL ethanol. The resulting mixture was refluxed for 9.5 hours, cooled to room temperature, and filtered to give the crude product as a white solid. The solid was stirred vigorously with 100 mL of boiling water and the cloudy supernatant was decanted away from a pasty solid. This material was stirred with hot dichloromethane and filtered to give the desired thiosemicarbazone derivative as a white solid (2.16 g).

EXAMPLE 3

Glyoxal (1 g of 40% aqueous solution, 6.9 mmol) and thiocarbohydrazide (0.69 g, 6.5 mmol) were combined in 30 mL methanol and stirred at room temperature overnight. The precipitated solid was filtered, washed with methanol, and air dried to give 1.23 g of a light brown solid.

EXAMPLE 4

L-Tyrosine hydrazide (2.65 g, 13.8 mmol) and glyoxal (1 mL of 40% solution, 6.9 mmol) were combined in 200 mL methanol and stirred overnight. The resulting homogeneous solution was evaporated to give the thiocarbohydrazone derivative (2.5 g) as a white solid.

EXAMPLE 5

The procedure of Example 4 was followed, except 2.02 g (16.5 mmol) of salicylaldehyde and thiocarbohydrazide (0.879 g, 8.27 mmol) were used. The product precipitated out of the reaction mixture. It was filtered and dried to give 1.98 g of the thiocarbohydrazone derivative.

EXAMPLE 6

A mixture of thiosemicarbazide (1.435 g, 15.75 mmol) and 2-acetylphenothiazine (3.8 g, 15/75 mmol) were combined in 85 mL ethanol and refluxed for 15 hours. The cooled reaction mixture was filtered and the solid material was stirred with boiling water, then filtered hot to remove unreacted thiosemicarbazide. The solid remaining was combined in about 200 mL ethanol and 50 mL dichloromethane with boiling, and filtered to remove a bright yellow solid (0.72 g) whose $^1$H NMR spectrum indicated it to be the desired thiosemicarbazone derivative.

EXAMPLE 7

Adipic dihydrazide (0.6 g, 3.45 mmol) and glyoxal (1 g of 40% aqueous solution, 6.9 mmol) were combined in 100 mL methanol and stirred at room temperature overnight. The homogeneous solution was evaporated to give the crude dihydrazone derivative (0.95 g) as a white solid.

EXAMPLE 8

Adipic dihydrazide (0.6 g, 3.45 mmol) and glyoxal (1 g of 40% aqueous solution, 6.9 mmol) were combined in 100 mL methanol and stirred at room temperature overnight. To the homogeneous solution was added thiocarbohydrazide (0.367 g, 3.45 mmol) and stirring continued for another 2 days. The product (1.2 g) was isolated as a yellow solid.

EXAMPLE 9

Terephthaldicarboxaldehyde (0.265 g, 1.98 mmol) and thiocarbohydrazide (0.105 g, 0.99 mmol) were combined in 100 mL methanol containing 5 mL water and were stirred overnight at room temperature. A second portion of thiocarbohydrazide (0.052, 0.99 mmol) was added and the solution was stirred for 2 days at room temperature. The solid precipitate was separated and was dried to obtain 0.23 g of the product as a greenish-yellow solid.

EXAMPLE 10

Using the procedure described in Example 1, 2-chlorobenzaldehyde was converted into the semicarbazone derivative in 85% yield.

EXAMPLE 11

Into a 250 mL flask was placed 1.22 g (10 mmol) of salicylaldehyde, 200 mL ethanol, and 1.06 g (10 mmol) of thiocarbohydrazide. After stirring for ½ hour at room temperature, the mixture was heated under reflux for 2 hours. The clear solution was cooled to room temperature and placed in a refrigerator for 2 days. A pale yellow solid precipitated which was filtered and dried to give 1.44 g of the product.

Polymerization of Vinyl Monomers

The following methods were used to carry out vinyl chloride polymerization in the suspension mode in the presence of the various scale prevention agents of this invention. By a proper choice of emulsifying agent and reaction apparatus, the polymerization of vinyl chloride and other vinyl monomers can also be performed in the emulsion mode.

EXAMPLES 12 TO 21

Suspension Polymerization of Vinyl Chloride. General Procedure

A 500 mL EZE SS-316 autoclave equipped with a cooling jacket and a stirrer (from Autoclave Engineers) was left uncoated or was coated completely on its inner surfaces with a coating solution of Example 1, 3 to 5, or 8 to 11. The autoclave was sealed and subjected to three cycles of evacuation followed by nitrogen purge. After evacuating the autoclave again, a water solution of 0.1 g of hydroxypropyl cellulose (sold as "Methocell E50" by Dow Chemical Co.) in 190 mL of deaerated demineralized water was sucked into the autoclave. Then 18 mL of a 1% poly(vinyl alcohol) (80% hydrolyzed; Aldrich) in degassed, demineralized water was introduced via a septum into the autoclave. The autoclave was evacuated again briefly without stirring and was cooled to about 5° C. Vinyl chloride gas was condensed into the autoclave with stirring until ¼ lb (113 g) had been transferred. When the internal pressure was below 20 psig (138 kPa), the polymerization initiator (0.15 mL of 75 wt % tert-butylperoxyneodecanoate in odorless mineral spirits (sold as "Luperox 10M-75" by Elf Atochem) was syringed out and injected into the autoclave via a septum, and the mixture was agitated at 500 rpm. The coolant fluid circulation to the reactor jacket was stopped and another circulating bath pre-heated to about 72° C. was connected to the reactor jacket. The reactor temperature was set to 62° C. on the control tower. The internal reactor temperature reached 62° C. in about 0.5 hours. After 5 hours of stirring, the heat was turned off, the excess vinyl chloride was vented off, and the PVC water slurry was filtered. The PVC obtained was air dried at room temperature to a constant weight. It was tested for lightness and yellowness using ASTM E1164 (standard practice for obtaining spectrophotometric data for object color evaluation), which defines the terms "L," "a," and "b."

The results obtained by evaluating several scale reducing agents are shown in the following table. All reactor coatings were prepared as 2 wt % solutions in a 80/20 mixture of 2 wt % aqueous NaOH/ethanol unless otherwise indicated. In the table, 100 is a perfect lightness score (L) and 0 is a perfect yellowness score (a or b). The table shows that some of the novel coatings had high scale-preventing activity, high lightness, and low yellowness characteristics.

| Polymerization Example | Coating Example | Fouling Observations | | | PVC (g) | L | a | b |
| --- | --- | --- | --- | --- | --- | --- | --- | --- |
| | | Solution | Interface | Above interface | | | | |
| 12 | No coating | high | high | high | ND | ND | ND | ND |
| 13 | 1 | none | low | medium | 75.5 | 94.269 | −0.243 | 5.011 |
| 14 | 3 | none | low | low | 77.2 | 89.091 | 0.127 | 6.636 |

-continued

| Polymerization Example | Coating Example | Fouling Observations | | | PVC (g) | L | a | b |
|---|---|---|---|---|---|---|---|---|
| | | Solution | Interface | Above interface | | | | |
| 15 | 4 | low | low | low | 77.3 | 96.509 | −0.408 | 1.538 |
| 16 | 5 | none | low | low | 74.4 | 95.151 | −1.546 | 6.868 |
| 17 | 5[c] | v. low | low | v. low | 79.7 | 95.277 | −1.068 | 4.803 |
| 18 | 8 | none | v. low | none | 81.6 | 93.314 | 0.081 | 4.729 |
| 19 | 9[d] | none | low | v. low | 76.3 | 89.091 | 0.127 | 6.636 |
| 20 | 10 | medium | medium | high | 76.6 | ND | ND | ND |
| 21 | 11 | none | none | v. Low | 76.6 | 94.164 | 0.968 | 4.769 |

ND = not determined
[c]coating solvent was DMF
[d]coating solution was filtered before application

We claim:

1. A method of inhibiting the formation of scale on reactor surfaces in contact with a polymerizing vinyl monomer comprising contacting said reactor surfaces with a scale reducing agent that comprises an acid hydrazone condensate or a salt thereof.

2. A method according to claim 1 wherein said acid hydrazone condensate has the general formula

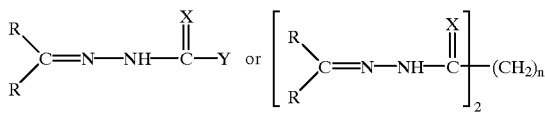

where each R is independently selected from the group consisting of hydrogen, alkyl from $C_1$ to $C_{15}$, and aryl, alkaryl, aralkyl, alkarythio, and aralkylthio from $C_6$ to $C_{15}$, X is oxygen or sulfur, Y is R or R substituted with $N(R')_2$, OR', COOR', or $SO_3R'$, each R' is independently selected from the group consisting of H, alkyl from $C_1$ to $C_{15}$, and alkaryl and aralkyl from $C_7$ to $C_{15}$, and n is 0 to 12.

3. A method according to claim 2 wherein said acid hydrazone condensate has the general formula

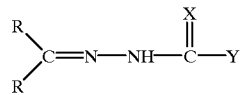

where each R is independently selected from the group consisting of H and alkyl from $C_1$ to $C_6$ and Y is a carboxylic acid hydrazide that has an OH or $NH_2$ substituted aromatic ring.

4. A method according to claim 2 wherein said acid hydrazone condensate has the general formula

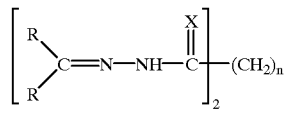

where each R is independently selected from the group consisting of H and alkyl from $C_1$ to $C_6$ and n is 1 to 4.

5. A method according to claim 2 wherein X is sulfur.
6. A method according to claim 2 wherein X is oxygen.
7. A method according to claim 1 wherein said acid hydrazone condensate is a salt.
8. A method according to claim 1 wherein said acid hydrazone condensate is not a salt.
9. A method according to claim 1 wherein said vinyl monomer is vinyl chloride.

10. A method according to claim 1 wherein said scale reducing agent is used with about 1 to about 100 wt % of a surface active agent.

11. A method according to claim 1 wherein said scale reducing agent is used with about 10 to about 500 wt % of an inorganic binder.

12. A method according to claim 11 wherein said inorganic binder is fumed silica.

13. A method according to claim 1 wherein said scale reducing agent is prepared by reacting a carbonyl derivative with a carbonyl compound.

14. A method according to claim 1 wherein said reactor surfaces are coated with a composition containing said scale reducing agent.

15. A method according to claim 1 wherein said scale reducing agent is mixed with said vinyl monomer.

16. A method of inhibiting the formation of scale on reactor surfaces in contact with polymerizing vinyl chloride monomer comprising coating said reactor surfaces with a composition containing a scale reducing agent having the general formula

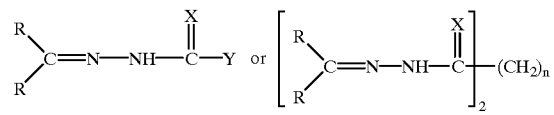

or a salt thereof, where each R is independently selected from the group consisting of H and alkyl from $C_1$ to $C_6$, X is O or S, Y is a carboxylic acid hydrazide that has an OH or $NH_2$ substituted aromatic ring, and n is 1 to 4.

17. A method according to claim 16 wherein said scale reducing agent has the general formula.

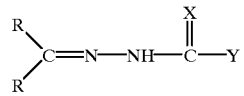

18. A method according to claim 14 wherein scale reducing agent has the general formula

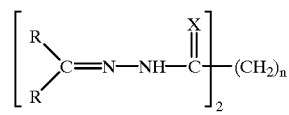

19. A method of inhibiting the formation of scale on reactor surfaces in contact with polymerizing vinyl chloride monomer comprising coating said reactor surfaces with a composition which comprises (A) an acid hydrazone condensate or a salt thereof made by condensing a carbonyl compound having the general formula

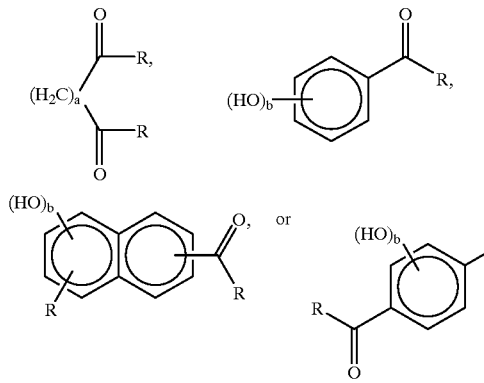

with a carbonyl derivative having the general formula

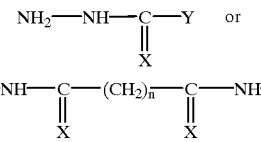

$$NH_2-NH-C(=X)-(CH_2)_n-C(=X)-NH-NH_2$$

and optionally reacting with a base, where each R is independently selected from the group consisting of H and alkyl from $C_1$ to $C_6$, X is O or S, Y is a carboxylic acid hydrazide that has an OH or $NH_2$ substituted aromatic ring, and n is 1 to 4;

(B) about 1 to about 100 wt % of a surface active agent; and (C) about 10 to about 500 wt % of an inorganic binder.

20. A method according to claim 19 wherein said inorganic binder is fumed silica.

* * * * *